United States Patent
Rao et al.

(10) Patent No.: US 10,606,378 B2
(45) Date of Patent: Mar. 31, 2020

(54) DYNAMIC RECONFIGURABLE DISPLAY KNOBS

(71) Applicant: Harman International Industries, Incorporated, Stamford, CT (US)

(72) Inventors: Rashmi Rao, West Bloomfield, MI (US); Elijah Auger, Farmington Hills, MI (US); Dan DeClerck, Milford, MI (US); Royce D. Channey, Ann Arbor, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 1 day.

(21) Appl. No.: 15/775,211

(22) PCT Filed: Nov. 18, 2016

(86) PCT No.: PCT/US2016/062887
§ 371 (c)(1),
(2) Date: May 10, 2018

(87) PCT Pub. No.: WO2017/087872
PCT Pub. Date: May 26, 2017

(65) Prior Publication Data
US 2018/0373350 A1     Dec. 27, 2018

Related U.S. Application Data

(60) Provisional application No. 62/258,359, filed on Nov. 20, 2015.

(51) Int. Cl.
*G06F 3/0362* (2013.01)
*G06F 9/451* (2018.01)
(Continued)

(52) U.S. Cl.
CPC .......... *G06F 3/0362* (2013.01); *B60K 35/00* (2013.01); *B60K 37/02* (2013.01); *B60K 37/06* (2013.01);
(Continued)

(58) Field of Classification Search
CPC ...... G06F 3/0362; G06F 3/0416; G06F 3/038; G06F 3/0482; G06F 3/04886;
(Continued)

(56) References Cited

U.S. PATENT DOCUMENTS 6,492,978 B1 * 12/2002 Selig ................... G06F 3/04886
345/168
7,462,795 B2 * 12/2008 Montalvo .............. G05G 1/105
200/11 R
(Continued)

FOREIGN PATENT DOCUMENTS

DE        102010010574 A1     9/2011

OTHER PUBLICATIONS

European Patent Office, Extended European Search Report Issued in Application No. 16867273.1, dated Mar. 8, 2019, Germany, 7 pages.
(Continued)

*Primary Examiner* — Amare Mengistu
*Assistant Examiner* — Crystal Mathews
(74) *Attorney, Agent, or Firm* — McCoy Russell LLP

(57) ABSTRACT

Embodiments are disclosed for systems and methods for operating a display actuator to provide user-configurable actions. An example device for a human-machine interface includes a display on a first surface of the device, an input interface adapted to detect one or more of touch input, rotation input, and push input directed to the device, a controller configured to generate control instructions based on input received from the input interface, the control instructions including display instructions for controlling
(Continued)

output on the display, and an output interface configured to send at least a subset of the control instructions from the controller to a receiving device, the device being removably coupled to the receiving device.

18 Claims, 12 Drawing Sheets

(51) Int. Cl.
  B60K 37/06 (2006.01)
  B60K 37/02 (2006.01)
  B60K 35/00 (2006.01)
  B60Q 9/00 (2006.01)
  G06F 3/01 (2006.01)
  G06F 3/038 (2013.01)
  G06F 3/0482 (2013.01)
  G06F 3/0488 (2013.01)
(52) U.S. Cl.
  CPC .............. *B60Q 9/00* (2013.01); *G06F 3/016* (2013.01); *G06F 3/038* (2013.01); *G06F 3/0482* (2013.01); *G06F 3/04886* (2013.01); *G06F 9/451* (2018.02); *B60K 2370/122* (2019.05); *B60K 2370/126* (2019.05); *B60K 2370/128* (2019.05); *B60K 2370/145* (2019.05); *B60K 2370/1438* (2019.05); *B60K 2370/1442* (2019.05); *B60K 2370/158* (2019.05); *B60K 2370/1515* (2019.05); *B60K 2370/1537* (2019.05); *B60K 2370/334* (2019.05); *B60K 2370/52* (2019.05); *B60K 2370/573* (2019.05); *B60K 2370/586* (2019.05); *B60K 2370/589* (2019.05); *B60K 2370/741* (2019.05); *B60K 2370/834* (2019.05)
(58) Field of Classification Search
  CPC ........ B60K 35/00; B60K 37/02; B60K 37/06; B60K 2370/145; B60K 2370/52; B60K 2370/122; B60K 2370/126; B60K 2370/334; B60K 2370/1438; B60K 2370/1442; B60K 2370/573; B60K 2370/586; B60K 2370/1537; B60K 2370/589; B60K 2370/158; B60K 2370/741; B60K 2370/1515; B60K 2370/834; B60Q 9/00
  See application file for complete search history.

(56) References Cited

U.S. PATENT DOCUMENTS

| | | | | |
|---|---|---|---|---|
| 9,477,329 B1* | 10/2016 | Ding | .................... | G06F 3/0362 |
| 9,671,954 B1* | 6/2017 | Jaugilas | .................. | G06F 3/044 |
| 2002/0054030 A1* | 5/2002 | Murphy | ................ | G06F 1/1626 |
| | | | | 345/173 |
| 2004/0056781 A1* | 3/2004 | Rix | ....................... | G06F 3/0202 |
| | | | | 341/20 |
| 2005/0276448 A1 | 12/2005 | Pryor | | |
| 2006/0092129 A1* | 5/2006 | Choquet | ................ | G05G 1/105 |
| | | | | 345/156 |
| 2006/0256090 A1* | 11/2006 | Huppi | .................... | A63F 13/02 |
| | | | | 345/173 |
| 2006/0276940 A1* | 12/2006 | Berg | ...................... | B60K 35/00 |
| | | | | 701/1 |
| 2007/0068790 A1* | 3/2007 | Yerdon | ................ | H03K 17/962 |
| | | | | 200/600 |
| 2008/0004769 A1* | 1/2008 | Lenneman | .............. | B60K 37/06 |
| | | | | 701/36 |
| 2008/0030465 A1* | 2/2008 | Konet | ................... | G06F 3/0362 |
| | | | | 345/158 |
| 2008/0042993 A1* | 2/2008 | Jaeger | ................... | G06F 3/0416 |
| | | | | 345/173 |
| 2008/0192025 A1* | 8/2008 | Jaeger | ................... | G06F 3/0421 |
| | | | | 345/173 |
| 2008/0238879 A1* | 10/2008 | Jaeger | ................ | G06F 3/03545 |
| | | | | 345/173 |
| 2008/0300756 A1* | 12/2008 | Passaro | .................. | B60K 35/00 |
| | | | | 701/49 |
| 2008/0303800 A1* | 12/2008 | Elwell | .................... | G06F 3/0414 |
| | | | | 345/173 |
| 2009/0085880 A1* | 4/2009 | Vitale | ................. | B60R 11/0264 |
| | | | | 345/173 |
| 2009/0268163 A1* | 10/2009 | Bowden | ............... | G01C 21/365 |
| | | | | 353/13 |
| 2009/0309848 A1* | 12/2009 | Terada | .................... | G06F 3/0425 |
| | | | | 345/173 |
| 2009/0313584 A1 | 12/2009 | Kerr et al. | | |
| 2010/0020042 A1* | 1/2010 | Stelandre | ............... | B60K 35/00 |
| | | | | 345/174 |
| 2010/0057273 A1* | 3/2010 | Heers | ..................... | B60K 35/00 |
| | | | | 701/1 |
| 2010/0079403 A1* | 4/2010 | Lynch | ................... | G06F 3/0202 |
| | | | | 345/174 |
| 2010/0110016 A1* | 5/2010 | Ladouceur | .............. | G06F 3/041 |
| | | | | 345/173 |
| 2010/0194677 A1* | 8/2010 | Fiebrink | ............. | G06F 3/04847 |
| | | | | 345/156 |
| 2010/0214213 A1* | 8/2010 | Bowden | ................. | B60K 35/00 |
| | | | | 345/157 |
| 2010/0250071 A1 | 9/2010 | Pala et al. | | |
| 2010/0259375 A1* | 10/2010 | Ferren | .................... | B60K 35/00 |
| | | | | 340/462 |
| 2010/0306650 A1* | 12/2010 | Oh | ........................ | G06F 3/0482 |
| | | | | 715/702 |
| 2010/0313124 A1* | 12/2010 | Privault | .............. | G06F 3/04812 |
| | | | | 715/702 |
| 2011/0050587 A1* | 3/2011 | Natanzon | ............ | G06F 3/04842 |
| | | | | 345/173 |
| 2011/0074739 A1* | 3/2011 | Kikin-Gil | ............. | G06F 3/0488 |
| | | | | 345/176 |
| 2011/0157056 A1* | 6/2011 | Karpfinger | ............ | G06F 3/0202 |
| | | | | 345/173 |
| 2011/0184824 A1* | 7/2011 | George | ..................... | G01D 5/39 |
| | | | | 705/24 |
| 2011/0227841 A1* | 9/2011 | Argiro | .................... | G06F 3/016 |
| | | | | 345/173 |
| 2011/0248838 A1 | 10/2011 | Krahenbuhl et al. | | |
| 2011/0263293 A1* | 10/2011 | Blake | ..................... | B60K 35/00 |
| | | | | 455/557 |
| 2011/0298721 A1* | 12/2011 | Eldridge | ............. | G06F 3/0362 |
| | | | | 345/173 |
| 2012/0007808 A1* | 1/2012 | Heatherly | ............. | G06F 3/0416 |
| | | | | 345/173 |
| 2012/0017147 A1 | 1/2012 | Mark | | |
| 2012/0055764 A1* | 3/2012 | Lekmine | .............. | B60H 1/0065 |
| | | | | 200/4 |
| 2012/0068956 A1* | 3/2012 | Jira | ........................ | B60K 37/06 |
| | | | | 345/174 |
| 2012/0130547 A1* | 5/2012 | Fadell | ..................... | F24F 11/30 |
| | | | | 700/276 |
| 2012/0221188 A1 | 8/2012 | Kelly, III | | |
| 2012/0256862 A1* | 10/2012 | Wagner | .................... | G06F 3/048 |
| | | | | 345/173 |
| 2013/0033463 A1* | 2/2013 | Geyl | ...................... | B60K 35/00 |
| | | | | 345/184 |
| 2013/0044080 A1* | 2/2013 | Chiang | ................... | G06F 3/017 |
| | | | | 345/174 |
| 2013/0145279 A1 | 6/2013 | Ricci | | |
| 2013/0161052 A1* | 6/2013 | Willmot | ..................... | F02C 7/12 |
| | | | | 174/59 |
| 2013/0179811 A1* | 7/2013 | Nagara | .................... | G06F 3/0304 |
| | | | | 715/765 |
| 2013/0241720 A1* | 9/2013 | Ricci | ...................... | G06F 3/0486 |
| | | | | 340/425.5 |
| 2014/0183011 A1* | 7/2014 | Park | ..................... | H01H 25/065 |
| | | | | 200/4 |

(56) References Cited

U.S. PATENT DOCUMENTS

| | | | | |
|---|---|---|---|---|
| 2014/0325994 | A1* | 11/2014 | Dowdell | H01R 12/77 60/801 |
| 2016/0176292 | A1* | 6/2016 | Blaesing | B60K 35/00 335/219 |
| 2016/0349926 | A1* | 12/2016 | Okumura | G03B 21/00 |
| 2017/0108944 | A1* | 4/2017 | Horvath | G06F 3/0362 |
| 2017/0183033 | A1* | 6/2017 | Jaramillo-Moscoso | B60K 35/00 |
| 2017/0241814 | A1* | 8/2017 | Degowske | G01D 13/22 |
| 2017/0255280 | A1* | 9/2017 | Pacsai | G06F 3/0362 |
| 2018/0373350 | A1* | 12/2018 | Rao | B60K 35/00 |
| 2019/0101956 | A1* | 4/2019 | Unnikrishnan | G06F 1/1684 |

OTHER PUBLICATIONS

ISA United States Patent and Trademark Office, International Search Report and Written Opinion Issued in Application No. PCT/US2016/62887, dated Feb. 2, 2017, WIPO, 11 pages.

* cited by examiner

DYNAMIC RECONFIGURABLE DISPLAY KNOBS

CROSS REFERENCE TO RELATED APPLICATIONS

The present application claims priority to U.S. Provisional Application No. 62/258,359, entitled "DYNAMIC RECONFIGURABLE DISPLAY KNOBS", filed on Nov. 20, 2015, the entire contents of which are hereby incorporated by reference for all purposes.

FIELD

The disclosure relates to reconfigurable user interface objects in a vehicle or other display environment.

BACKGROUND

Vehicles may include various systems that may be controlled by a user. For example, vehicles may include climate systems, radio/media playback devices, vehicle control (e.g., propulsion, steering, gear shifting, etc.), navigation systems, and/or other systems. A user may also interact with a computing device in the vehicle that interfaces with a personal mobile device (e.g., via a wireless connection).

SUMMARY

Embodiments are disclosed for systems and methods for operating a display actuator to provide user-configurable actions. In some examples, a device for a human-machine interface includes a display on a first surface of the device, an input interface adapted to detect one or more of touch input, rotation input, and push input directed to the device, a controller configured to generate control instructions based on input received from the input interface, the control instructions including display instructions for controlling output on the display, and an output interface configured to send at least a subset of the control instructions from the controller to a receiving device, the device being removably coupled to the receiving device.

In some examples, a method for controlling a human-machine interface via an input device removably coupled to a receiving device, the method including receiving, via an input interface of the input device, user input including one or more of touch input, rotation input, and push input provided to the input device, generating, via a controller of the input device, control instructions based on the user input, the control instructions including display instructions for controlling output on a display positioned on a top surface of the input device, and sending, via an output interface of the input device, at least a subset of the generated control instructions to the receiving device.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
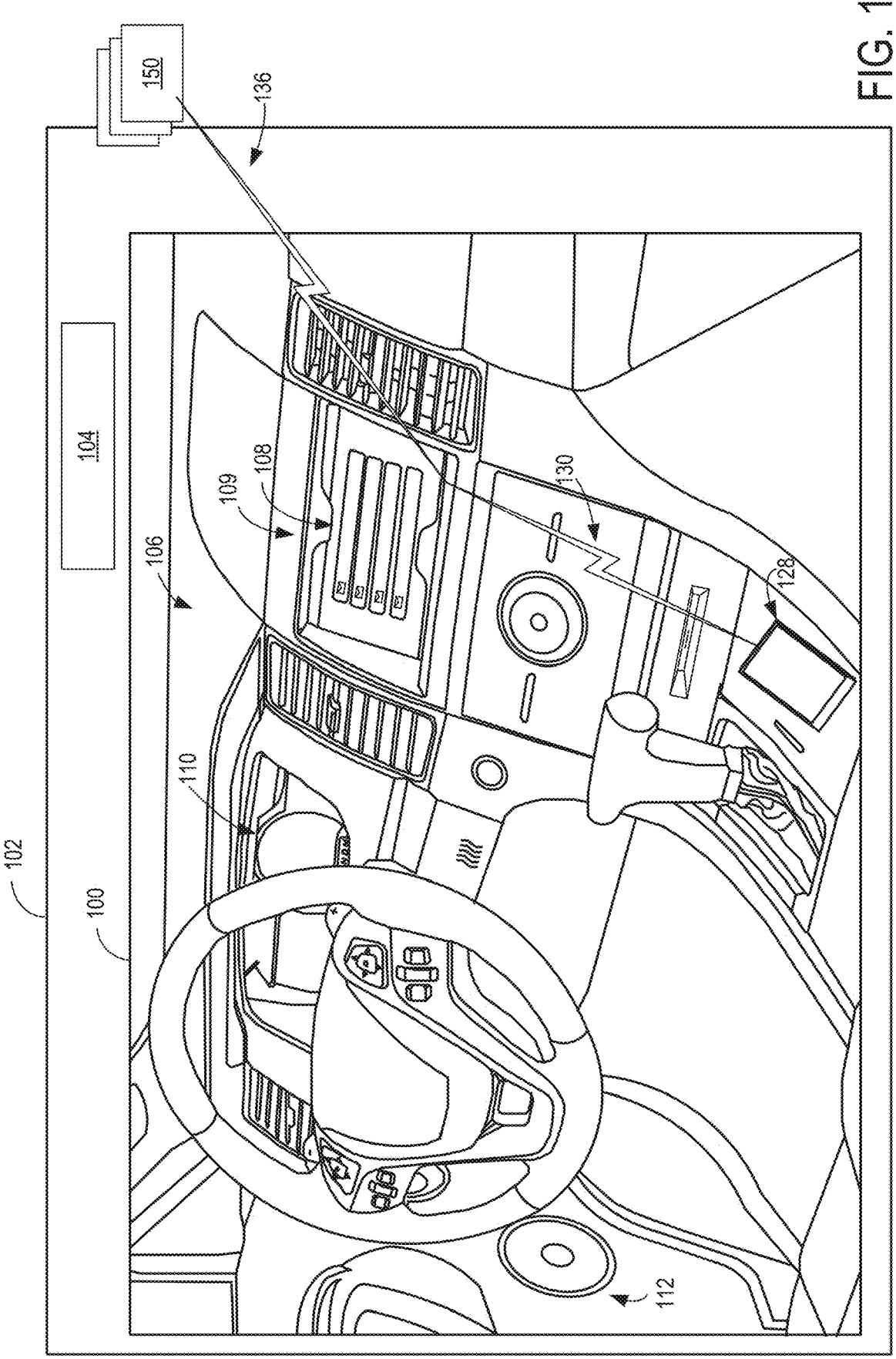
FIG. 1 shows an example partial view of a vehicle cabin in accordance with one or more embodiments of the present disclosure.

FIG. 1 shows an example partial view of one type of environment for a multi-view user interface: an interior of a cabin 100 of a vehicle 102, in which a driver and/or one or more passengers may be seated. Vehicle 102 of FIG. 1 may be a motor vehicle including drive wheels (not shown) and an engine 104. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle. Vehicle 102 may be a motorcycle, a marine vehicle, a locomotive, or any other vehicle in some examples.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors, microphones to receive user input in the form of voice commands, to measure road noise, to enable a user to conduct telephone calls, and/or to measure ambient noise in the cabin 100, cameras mounted on the vehicle, accelerometer and/or gyroscopes coupled to the vehicle capable of measuring acceleration of the vehicle, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 150 and/or mobile device 128.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct Near-Field Communication [NFC], cellular connectivity, etc.) and configured to provide two-way communication between the mobile device and the in-vehicle computing system. The mobile device 128 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smartwatch, GPS system, camera, accelerometer, gyroscope, inclinometer etc. External devices 150 may be connected to the in-vehicle computing system via communication link 136 which may be wired or wireless, as discussed with reference to communication link 130, and configured to provide two-way communication between the external devices and the in-vehicle computing system. In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150. In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128.

Figure 2:
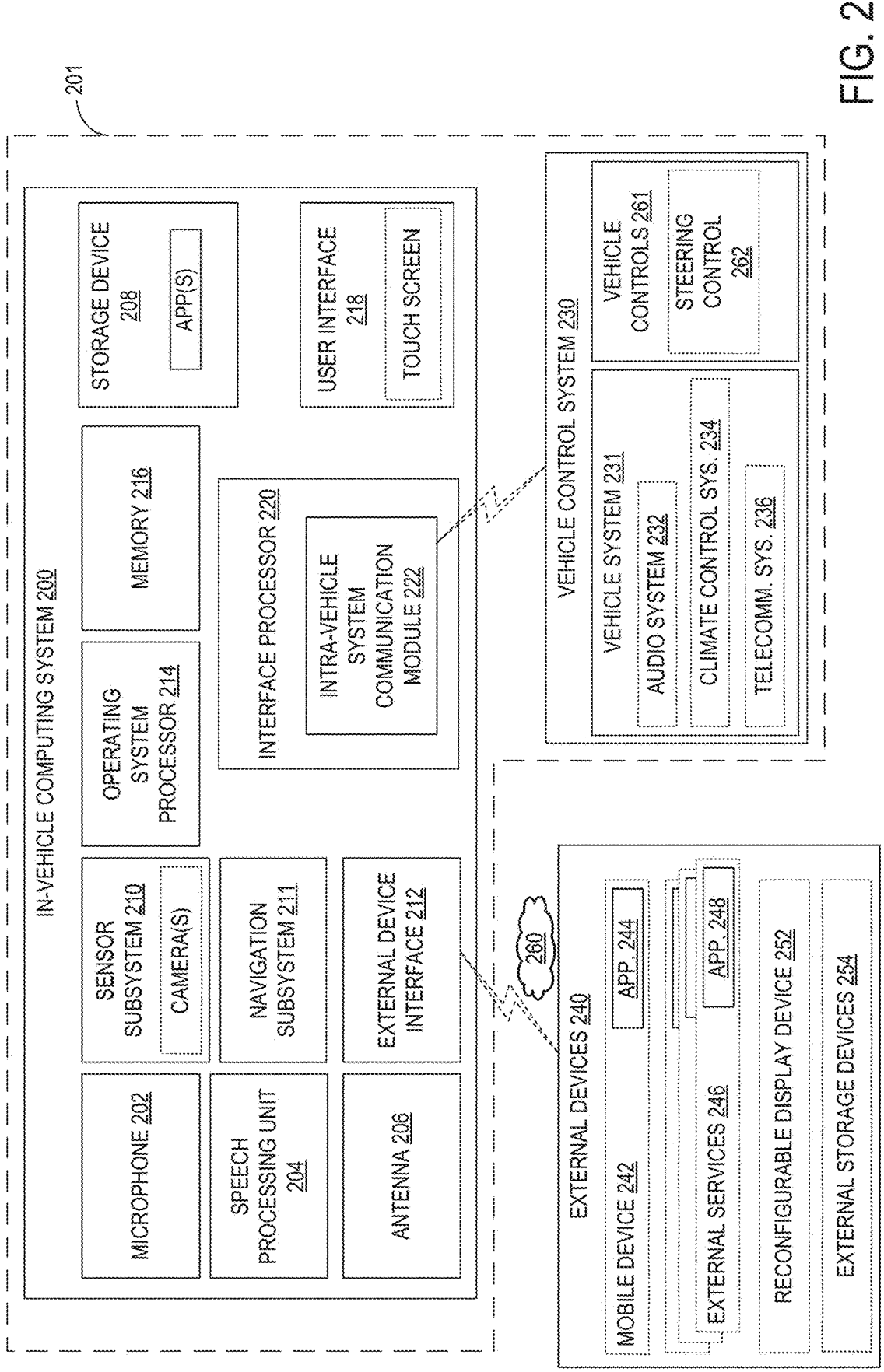
FIG. 2 shows an example in-vehicle computing system in accordance with one or more embodiments of the present disclosure.

FIG. 2 shows a block diagram of an in-vehicle computing system 200 configured and/or integrated inside vehicle 201. In-vehicle computing system 200 may be an example of in-vehicle computing system 109 of FIG. 1 and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 201 in order to enhance an in-vehicle experience for a driver and/or a passenger.

In-vehicle computing system 200 may include one or more processors including an operating system processor 214 and an interface processor 220. Operating system processor 214 may execute an operating system on the in-vehicle computing system, and control input/output, display, playback, and other operations of the in-vehicle computing system. The operating system may control and/or oversee the execution of applications of the in-vehicle computing system. Interface processor 220 may interface with a vehicle control system 230 via an intra-vehicle system communication module 222.

Intra-vehicle system communication module 222 may output data to other vehicle systems 231 and vehicle control elements 261, while also receiving data input from other vehicle components and systems 231, 261, e.g. by way of vehicle control system 230. When outputting data, intra-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 200 to store data such as instructions executable by processors 214 and 220 in non-volatile form. The storage device 208 may store application data to enable the in-vehicle computing system 200 to run one or more applications, which may connect to a cloud-based server and/or collect information for transmission to the cloud-based server, control vehicle systems, display information, accept user input, and/or perform any other suitable function. The application may retrieve information gathered by vehicle systems/sensors, input devices (e.g., user interface 218), devices in communication with the in-vehicle computing system (e.g., a mobile device connected via a Bluetooth link, reconfigurable display knob mounted to a display of the in-vehicle computing system), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214 and/or interface processor 220), may control the in-vehicle computing system 200 to perform one or more of the actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202.

One or more additional sensors may be included in a sensor subsystem 210 of the in-vehicle computing system 200. For example, the sensor subsystem 210 may include a camera, such as a rear view camera for assisting a user in parking the vehicle, a cabin camera for identifying a user (e.g., using facial recognition and/or user gestures), and/or a front view camera. Sensor subsystem 210 of in-vehicle computing system 200 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, vehicle motion, vehicle inclination, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver. The navigation subsystem 211 may include an inertial navigation system that may further determine a position, orientation, and velocity of the vehicle via motion and rotation sensor inputs. Examples of motion sensors include accelerometers, and examples of rotation sensors include gyroscopes. The navigation subsystem 211 may communicate with motion and rotation sensors included in the sensor subsystem 210. Alternatively, the navigation subsystem 211 may include motion and rotation sensors and determine the movement and rotation based on the output of these sensors.

External device interface 212 of in-vehicle computing system 200 may be coupleable to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a Bluetooth, NFC, WIFI direct, or other wireless connection) or a reconfigurable display device 252 in some examples. Mobile device 242 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. External devices 240 may communicate with in-vehicle computing system 200 either wirelessly or via connectors without departing from the scope of this disclosure. For example, external devices 240 may communicate with in-vehicle computing system 200 through the external device interface 212 over network 260, a universal serial bus (USB) connection, a direct wired connection, a direct wireless connection, and/or other communication link. The external device interface 212 may provide a communication interface to enable the in-vehicle computing system to communicate with mobile devices associated with contacts of the driver.

One or more applications 244 may be operable on mobile device 242. As an example, mobile device application 244 may be operated to aggregate user data regarding interactions of the user with the mobile device. For example, mobile device application 244 may aggregate data regarding music playlists listened to by the user on the mobile device, telephone call logs, positional information including locations frequented by the user and an amount of time spent at each location, etc. The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level and/or music genre at the user's location, an ambient weather condition (temperature, humidity, etc.) at the user's location, etc., which may indicate a context of the user and/or vehicle. In some examples, the mobile device may be used to identify or authenticate a user within the vehicle. Mobile device application 244 may send control instructions to components (e.g., microphone, etc.) or other applications (e.g., navigational applications) of mobile device 242 to enable the requested data to be collected on the mobile device. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others. In some examples, the vehicle control system may receive instructions from or based on information from an external device, such as reconfigurable display device 252. The received instructions may be implemented by controlling the vehicle systems 231 identified in the instructions to perform an associated action indicated in the instructions.

Audio system 232 may include one or more acoustic reproduction devices including electromagnetic transducers such as speakers. Vehicle audio system 232 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 201. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. Vehicle controls 261 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system and/or a reconfigurable display device 252) may also be connected to computing system 200, such as via communication module 222. The control elements of the vehicle control system may be physically and permanently positioned on and/or in the vehicle for receiving user input. In addition to receiving control instructions from in-vehicle computing system 200, vehicle control system 230 may also receive input from one or more external devices 240 operated by the user, such as from mobile device 242. This allows aspects of vehicle systems 231 and vehicle controls 261 to be controlled based on user input received from the external devices 240.

In-vehicle computing system 200 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via RF such as via antenna(s) 206 or via infrared or other means through appropriate receiving devices. In some embodiments, antenna 206 may be included as part of audio system 232 or telecommunication system 236. Additionally, antenna 206 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages, as well as navigational assistance, may be displayed to the user on a display of the user interface.

Figure 3:
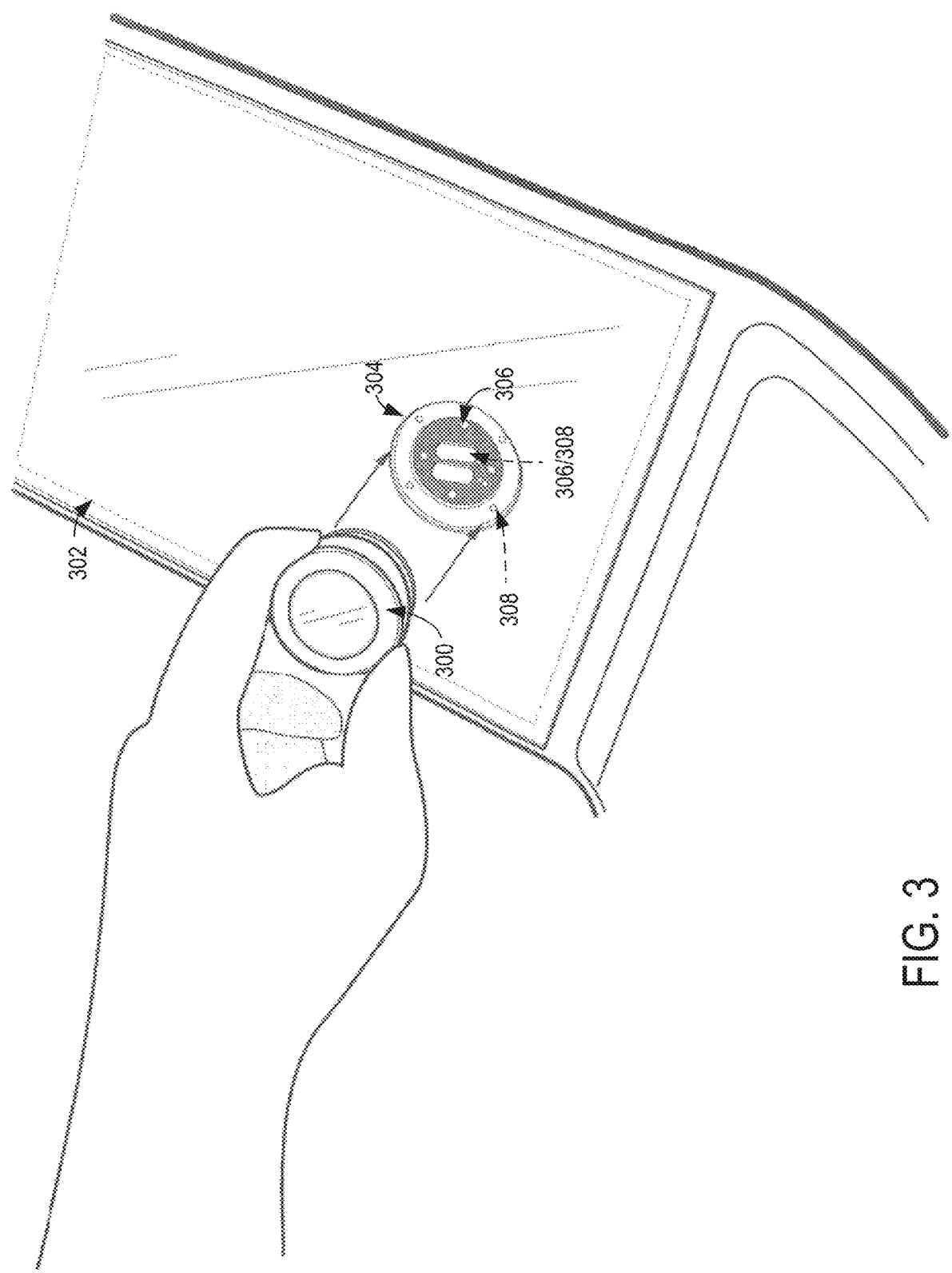
FIG. 3 shows an example fixing mechanism for a dynamic reconfigurable display knob in accordance with one or more embodiments of the present disclosure.

FIG. 3 shows an example dynamic reconfigurable display knob 300 that may be utilized within a vehicle cabin, such as vehicle cabin 100 of FIG. 1, and/or another display environment (e.g., a non-vehicle display environment, such as a mixer, media console for a disc jockey, other audio console, mobile computing device, tablet computing device, and/or other computing environment). In the illustrated example, display knob 300 is aligned to a location on an in-vehicle display surface 302. The in-vehicle display surface 302 may be a display of an in-vehicle computing system, a window, a dashboard, and/or any other suitable surface on which the display knob 300 may be mounted. In order to allow the display knob to be mounted on the display surface, a cut-out region 304 is provided on the display surface, including connectivity components 306 and securing components 308. For example, the connectivity components may include connectors to an underlying printed circuit board (PCB) or other electronic components. The securing components may include magnetic coupling mechanisms, mechanical connectors (e.g., regions sized/shaped to accept complementary regions of the display knob in a mating configuration), adhesive components, and/or other coupling mechanisms. The securing components may help to guide the display knob into a connected state via a magnetic force and/or a shape of the securing components. In some examples, the securing components may be provided along a periphery of the cut-out region 304, while the connectivity components may be within a central portion of the cut-out region 304. In other examples, the connectivity and/or securing components may be intermixed throughout the cut-out region 304.

The connectivity components in cut-out region 304 may form a portion of a larger backend electronic component. For example, the connectivity components may correspond to the center of a circular region of a lollipop-shaped PCB, where the remaining portions of the circular region and/or a stem of the lollipop-shaped PCB extend within an interior of the display surface (e.g., behind the display surface, where it is not viewable by a user) to reach other components of the vehicle or other display environment. For example, the PCB may connect to other vehicle systems and/or an electronic control unit of the vehicle outside of view of the user. The connectivity components may provide a data and/or power connection to the display knob 300.

Figure 4:
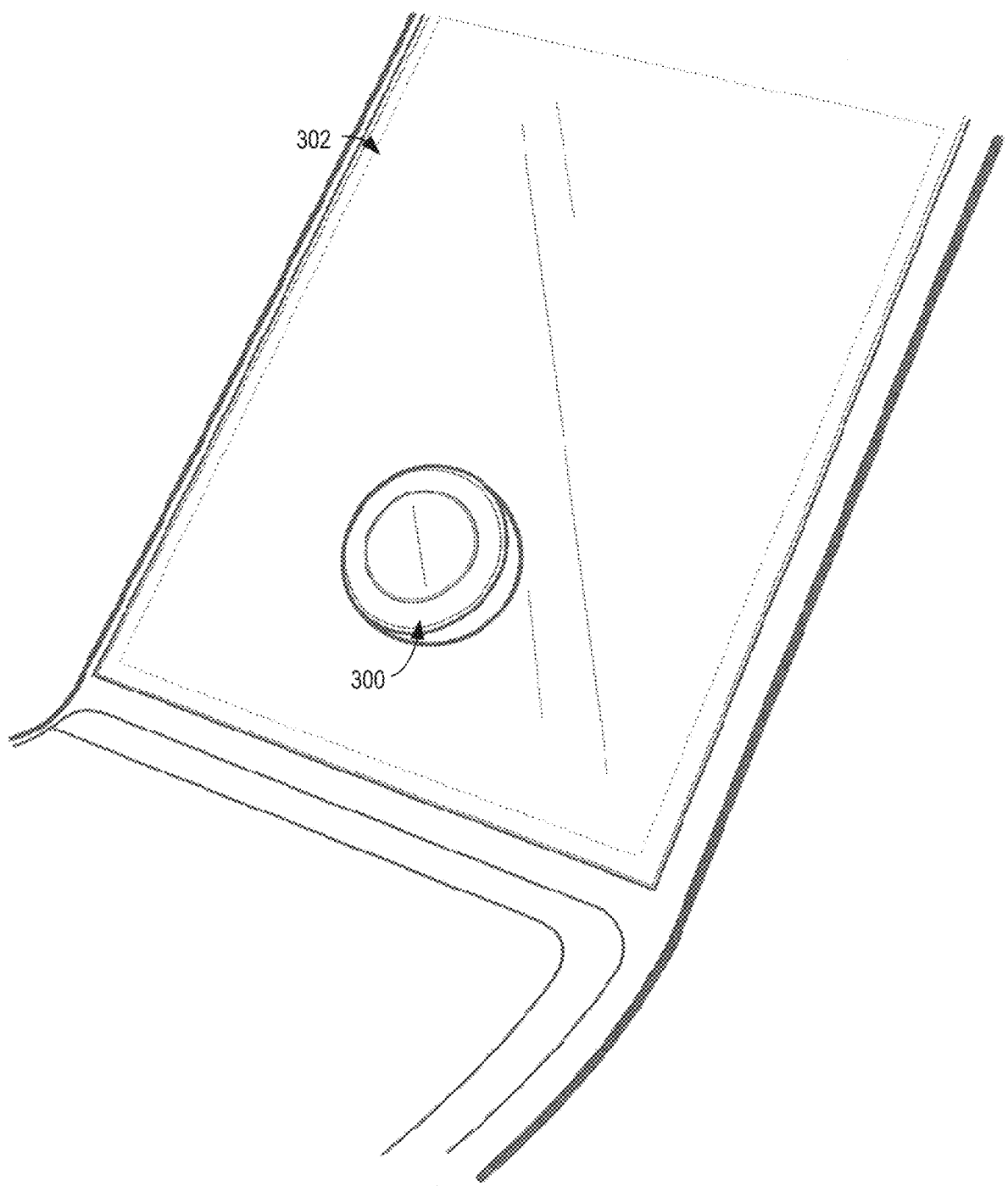
FIG. 4 shows an example dynamic reconfigurable display knob mounted on a surface in accordance with one or more embodiments of the present disclosure.

FIG. 4 shows the dynamic reconfigurable display knob 300 mounted on the display surface 302. For example, FIG. 4 illustrates a configuration in which the display knob 300 has been secured into the cut-out region 304 illustrated in FIG. 3. As shown, the display knob 300 may remain secured to the display surface 302 without additional support (e.g., from a user), and may be held in place via the securing components 308 illustrated in FIG. 3.

Figure 5:
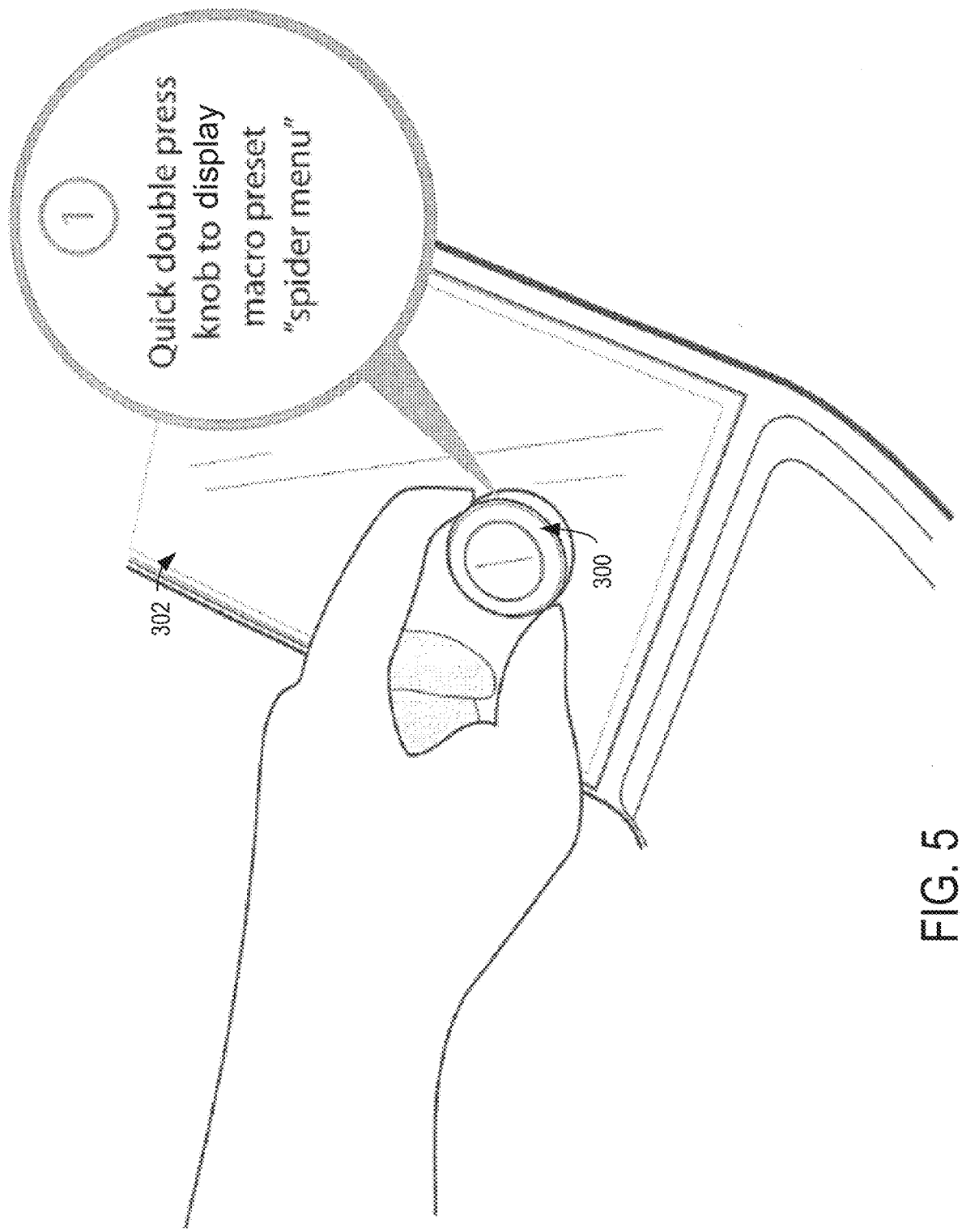
FIGS. 5 and 6 show example display outputs for a dynamic reconfigurable display knob in accordance with one or more embodiments of the present disclosure.
Figure 6:
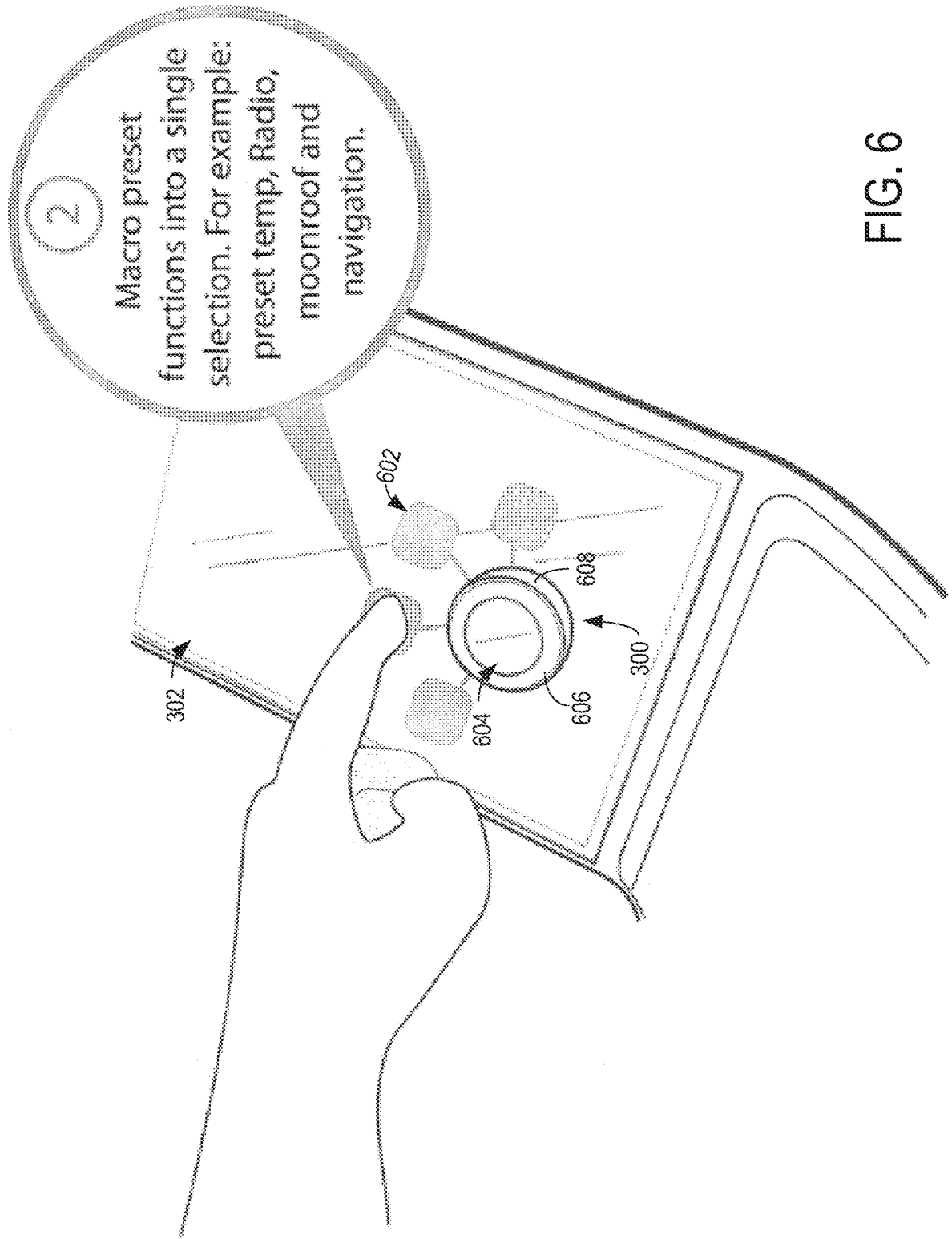

FIGS. 5 and 6 show example display outputs for the dynamic reconfigurable display knob 300. For example, responsive to providing a particular input (e.g., a quick double press to the knob in the illustrated example) to the display knob 300 in FIG. 5, a menu 602 may be displayed, as illustrated in FIG. 6. In the illustrated example, the menu 602 is projected in a "spider" pattern around the display knob 300. For example, the display knob 300 may include one or more projectors around a periphery of the knob configured to project displayable objects onto a surface (e.g., the display surface 302 in the illustrated example) to which the knob is mounted. The display knob may also include a display 604 on the knob surface. The display knob 300 may include one or more optical projection techniques to achieve such projection and display. For example, the optical projection technique used by the display knob 300 to achieve the integrated display 604 may include an optical taper that magnifies (X:1) or simply carries (1:1) the image to the knob surface or digital light processing (DLP), or other optical projection techniques. The display knob may additionally or alternatively include an organic light-emitting diode (OLED), liquid crystal display (LCD), or other integrated display/microdisplay/display panel, as well as an optional lens configuration within the knob assembly. The display knob 300 may project light for display onto a surface (e.g., external to the display knob) to provide a fully reconfigurable A surface around the perimeter of the knob (e.g., around the display lens surface).

As illustrated in FIG. 6, the menu 602 displayed around the display knob 300 may be interactive via touch input or any other suitable interface mechanism (e.g., voice input, actuation of the display knob 300 or other actuator, etc.). In examples where the user interacts with the menu 602 via touch input, the touch input may be detected by a touch sensor underlying the display surface 302 (e.g., where the display surface may include a touch screen) and/or by a touch sensor (e.g., one or more cameras or proximity detectors) within the display knob 300 or the display environment (e.g., mounted in a vehicle). For example, the display knob 300 may communicate data indicating a location of selectable menu options and associated functions/actions and/or may receive data (e.g., from a touch screen onto which the menu 602 is projected) indicating a location of a detected touch input. The display knob and/or a connected controller/processor may correlate the location of the menu options and the location of the touch input in order to determine that a selection of a menu option has been made and execute (or send commands to instruct another processor/controller to execute) the associated function/action.

As indicated in FIG. 6, the menu 602 may present macro preset functions into a single selection. For example, the menu 602 may include selectable user interface elements that are each selectable to control one or more vehicle systems to adhere to one or more user settings (e.g., a preset cabin temperature, a radio station/volume/media selection setting, a moonroof/sunroof state, a navigation setting, etc.). In this way, the user may select a user interface element from the menu 602 to enter a favorite driving mode (e.g., a cruising mode: air-conditioning off, windows and moonroof open, radio to 75% max volume, etc.; a nighttime rain mode: defrost on, windows and moonroof closed, radio to 30% max volume, headlights/fog lights on, windshield wipers on, etc.; and/or other macro presets for different driving/user conditions). The macro presets provided by the display knob may be user configurable, and may provide a setting for any vehicle system or connected computing device (e.g., the display knob may be communicatively connected to a smartphone via an in-vehicle computing system and may provide a setting to silence the smartphone, initiate a call, and/or perform other tasks relating to the smartphone). In this way, a user may control multiple vehicle systems with the selection of a single menu option provided by the display knob.

Other inputs may be provided via actuation of the display knob 300 itself. For example, the display knob may form a substantially cylindrical shape, with a top surface 606 that houses display 604 in a central region, and a side cylindrical surface 608 that extends around the circumference of the top surface 606 and down to the display surface 302 on which the display knob is mounted. In other examples, the display knob may take on any suitable shape, and respective top and side surfaces may provide the described features of the top surface 606 and side cylindrical surface 608 presented in this disclosure. The display knob 300 may include one or more touch-sensitive surfaces to detect touch input to a) the display 604, b) the periphery of the display along the top surface 606 of the display knob, c) the cylindrical side surface 608, and/or any other suitable region or portion of a surface of the display knob. For example, the display knob 300 may detect rotational input to the top or side surfaces without the user actually rotating the display knob itself (e.g., responsive to the user providing a rotational gesture in which the user's finger or other input device traverses around or partially around the circumference of the top and/or side surfaces of the display knob). In this way, orbital/rotational input may be achieved without physical rotation of the knob, and picked up responsive to rotation of the hand only. The touch input may be detectable via infrared, RGB, or other imaging, capacitive touch detection, pressure-based/displacement touch detection, and/or any other touch input interface/mechanism or combination of touch input interfaces/mechanisms. In some examples, different regions of the display knob may include different types of touch interfaces.

The display knob may additionally or alternatively be configured to rotate or move transversely relative to the display surface 302 while in a connected state (e.g., while mounted to the display surface). The rotation/translation of the display knob may also be performed by rotating/translating one or more components of the display knob assembly relative to one or more other components of the display knob assembly. For example, an outer cap of the display knob may rotate relative to an inner base of the display knob assembly. The display knob may be able to move with all six degrees of freedom (e.g., changes in position including forward/backward, up/down, and left/right translation in three perpendicular axes, as well as changes in orientation through rotation about three perpendicular axes to provide pitch, yaw, and roll movement) and/or with a subset of the six degrees of freedom. The display knob may provide joystick movement, push-button operation, sliding movement, and/or any other suitable actuation to navigate, select, and/or otherwise interact with an associated computing system/controller. In some examples, some surfaces may not be touch-sensitive, in order to allow the user to grip such surfaces to provide the above-described actuation without accidentally providing touch input.

The display knob may provide feedback responsive to input detected to the knob itself and/or to a menu or other image projected by the display knob onto an external surface. For example, the display knob may include rumble/vibration motor(s) and/or mechanical structures to provide haptic or sensory feedback for pushbutton/rotational/translational actuation and/or for touch input detected by the display knob.

Different types of actuation/touch input provided to the display knob/projected content may provide for different actions responsive to the input. The following includes non-limiting examples of actions mapped to inputs for illustrative purposes, however any suitable combination of inputs/actions may be provided by the display knob. In some examples, the mapping of inputs to actions may be dynamically reconfigurable by a user. In a first example, when a particular display knob is actuated (e.g., via push button or rotation), the display human-machine interface (HMI) may change to a specific mode (e.g., HVAC/climate control versus radio, etc.). For example, the HMI of an in-vehicle and/or infotainment computing system may change responsive to connecting and actuating a particular display knob to the in-vehicle computing system. In this way, different display knobs may provide different functionality responsive to the same inputs. In some examples, the knob function/actions may change based on a context of a displayed HMI (e.g., the in-vehicle computing system/infotainment system). Such a configuration may allow for the use of a single actuator in a system. The display knob may dynamically change content for left hand/right hand drive, or based on whether a passenger or driver is inputting (e.g., detected based on analysis of images captured in the vehicle, voice input detected, fingerprint detection, and/or any other authentication technique).

In one non-limiting example, a pattern of "press, press, press" (e.g., three presses separated by pauses that are shorter than a threshold) may enable a user to select through temperature, mode, fan speed, volume, tuner, or general selection. An input of a "short press" (e.g., a single press in which the display knob is pressed down for shorter than a threshold period of time, and followed by no input for above a threshold period of time) may be used to cycle through options. An input of a "long press" (e.g., a single press in which the display knob is pressed down for longer than a threshold period of time, and followed by no input for above a threshold period of time) may cause a mode to be set. In another example, an input of a "long press" may activate a spider menu (e.g., as illustrated in FIG. 6), and a rotational input may select through options of the spider menu. Such input mappings may allow for blind operation via tap/tap/tap actuation, etc. Any other suitable mapping and/or actuation may be performed.

A user may assign settings or functions to a knob actuation sequence to provide shortcuts for a group of functions. For example, a user may assign max fan speed, coldest cabin temperature setting, recirculating through upper vents, and assign this to a "tap-tap-tap-clockwise rotate" actuation of the display knob. As another example, the user may assign navigating to home, turning on climate control, setting volume to optimal, and open moonroof to "tap-rotate counterclockwise"). The above-described examples are non-limiting and any other suitable mapping may be assigned by the user and/or set as a default. In some examples, on vehicle startup, the knobs may default to a favorites mode that the user can select through. Accordingly, the functionality of the knobs may be reconfigured based on the status of the vehicle.

Figure 7:
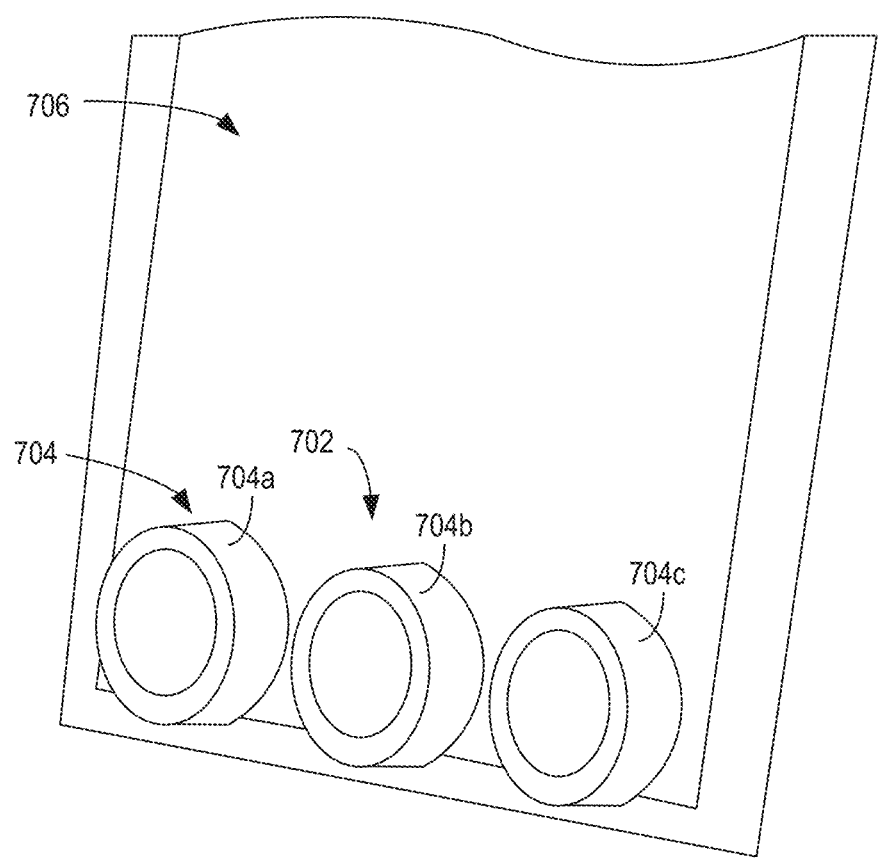
FIG. 7 shows a front isometric view of an example array of dynamic reconfigurable display knobs in accordance with one or more embodiments of the present disclosure.
Figure 8:
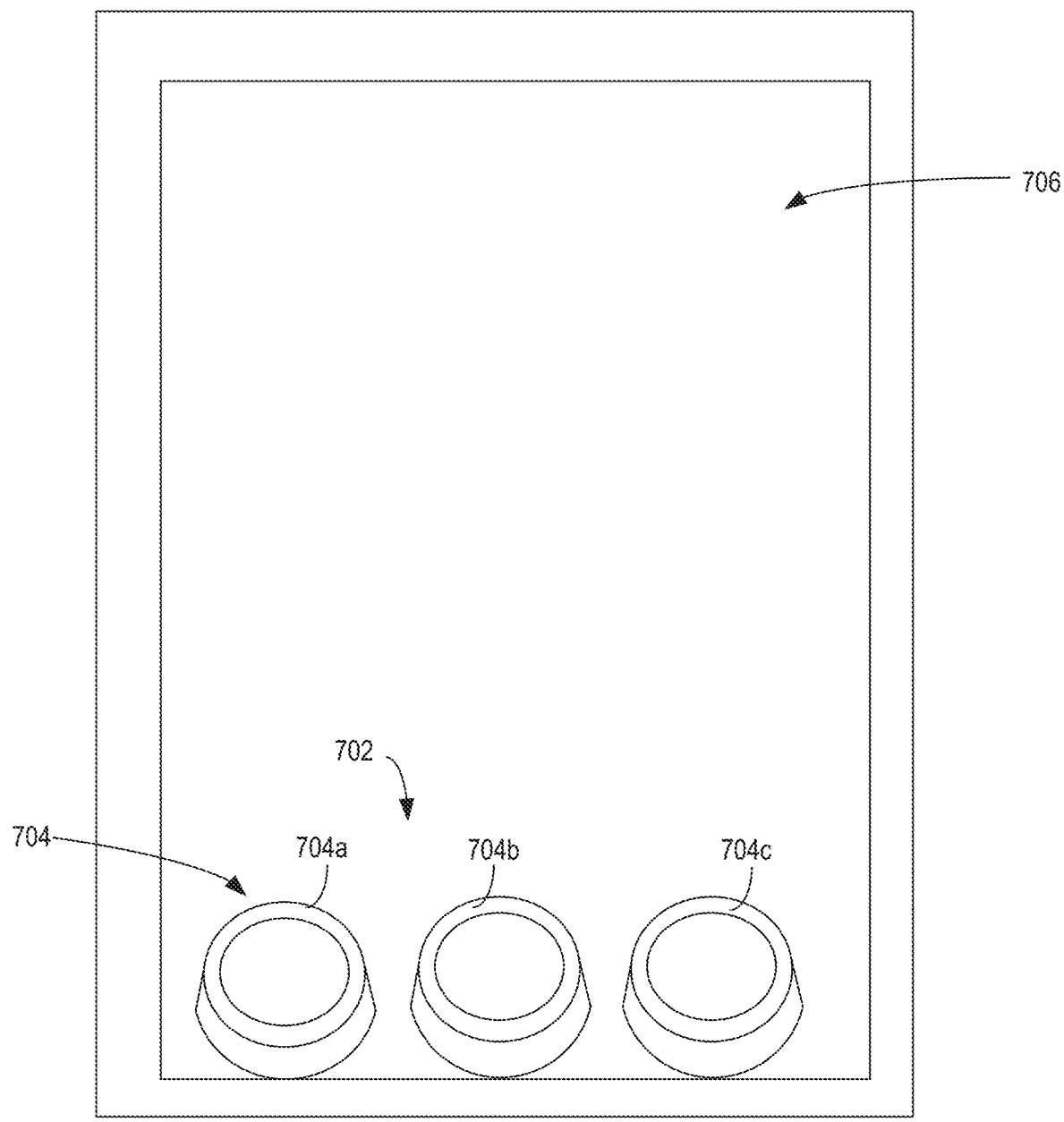
FIG. 8 shows a front view of an example array of dynamic reconfigurable display knobs in accordance with one or more embodiments of the present disclosure.

FIG. 7 shows a front isometric view of an example array 702 of dynamic reconfigurable display knobs 704 mounted on a display screen 706 of an in-vehicle computing system. FIG. 8 shows a front view of the example array 702 of dynamic reconfigurable display knobs 704. As described above, each knob may provide different functionalities, so the array of knobs may be used to provide a combination of functionality desired by the user.

Figure 9:
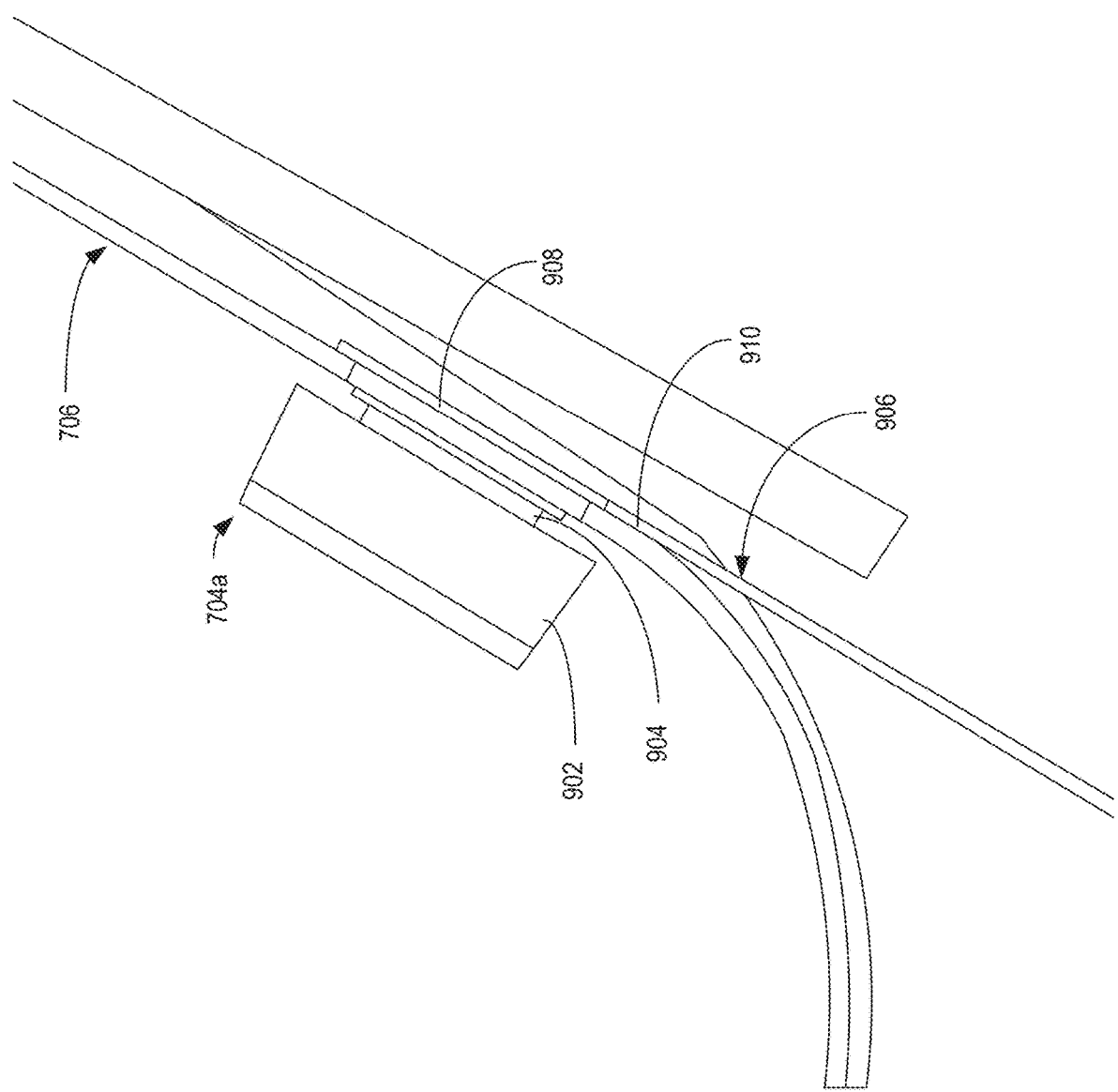
FIG. 9 shows a side view of an example array of dynamic reconfigurable display knobs in accordance with one or more embodiments of the present disclosure.

FIG. 9 shows a side view of the example array 702 of dynamic reconfigurable display knobs 704. As shown, one of the display knobs 704a includes a cap 902 positioned over a base 904. The differential sizing and/or coupling of the cap to the base may provide for the above-described types of movement of the display knob. The display knob, in the illustrated mounted state, is connected to a lollipop-shaped PCB 906, where the circular region (e.g., head) of the lollipop shape is illustrated at 908, where the PCB meets a cut-out region of the display surface to which the display knob is mounted, and the stem of the lollipop shape is illustrated at 910. In this way, a larger PCB may be used to provide connectivity to other vehicle systems, while minimizing the occluded region of the display surface to which the knob is mounted. In additional or alternative examples, the display knob may include a wireless interface (e.g., BLUETOOTH, WIFI, near-field communication [NFC], etc.) or direct/hard wired connection to a vehicle electronic control unit (ECU).

Figure 10:
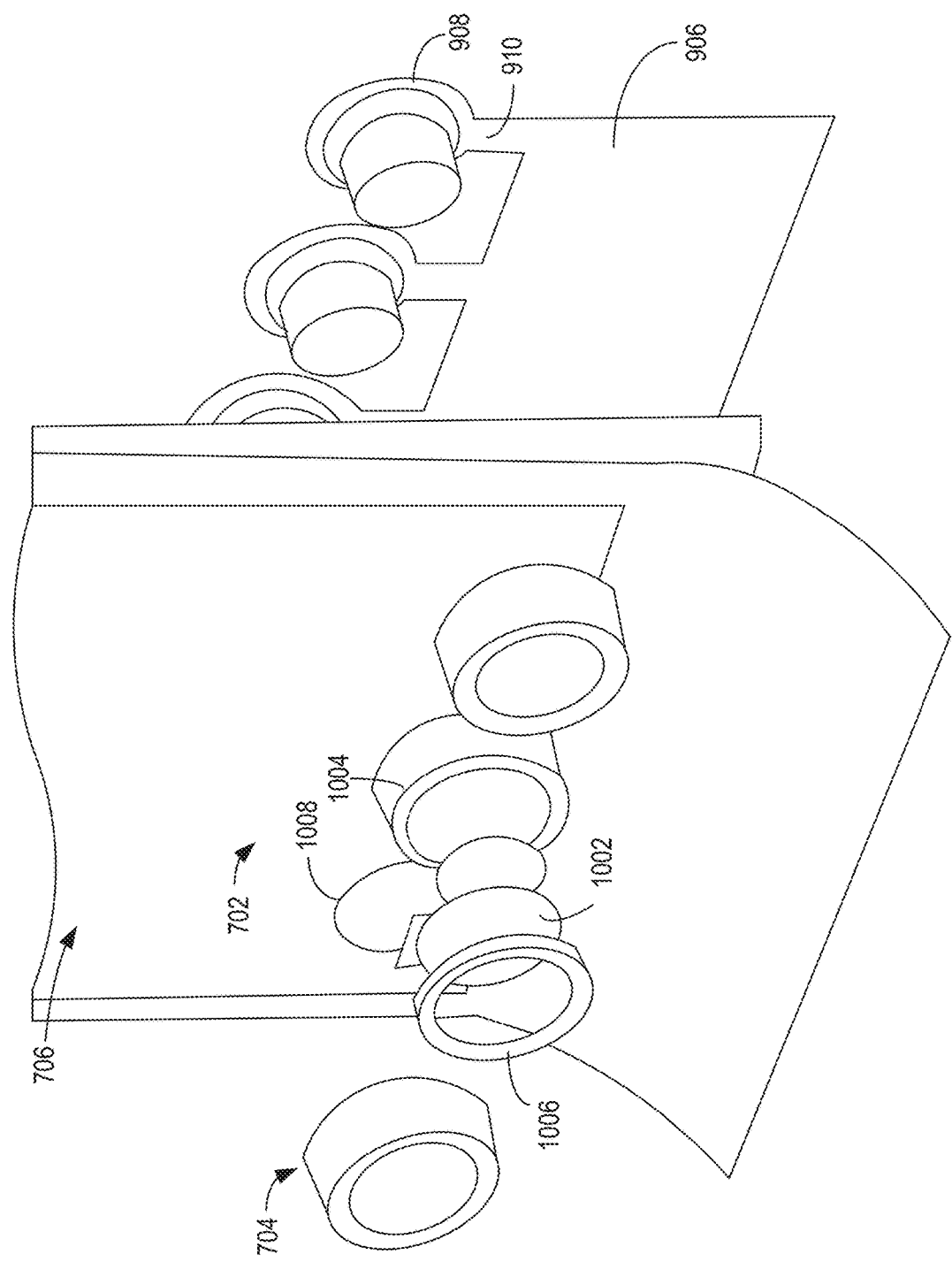
FIG. 10 shows an exploded view of an example array of dynamic reconfigurable display knobs in accordance with one or more embodiments of the present disclosure.

FIG. 10 shows an exploded view of the example array 702 of dynamic reconfigurable display knobs 704. As illustrated, each knob 704 may be connected to the same PCB 906 via a different lollipop head and stem of the PCB. Each knob may include a magnetic or other fixing of knob to cover lens. For example, the knobs may include a display and a lens covering the display 1002, each of which may be secured at the top surface of the knob via a ring 1004 and cover 1006 forming the cap 902 of the knob. A hole 1008 may be cut through the display surface (e.g., through the glass of a display device of the in-vehicle computing system), with lollipop PCB adhered (VHB) to B-surface of cover lens (e.g., to a rear of the knob). An encoder may be permanently fixed to the display surface/glass. Conductive oxides or silver nano wires, or PEDOT, or other printed circuit methods, on lens b-side of the display surface/glass may be used. An ACF bond encoder to ITO mask, and flex cable to driving circuit, may further make up the display knob circuitry and connectivity.

Figure 11:
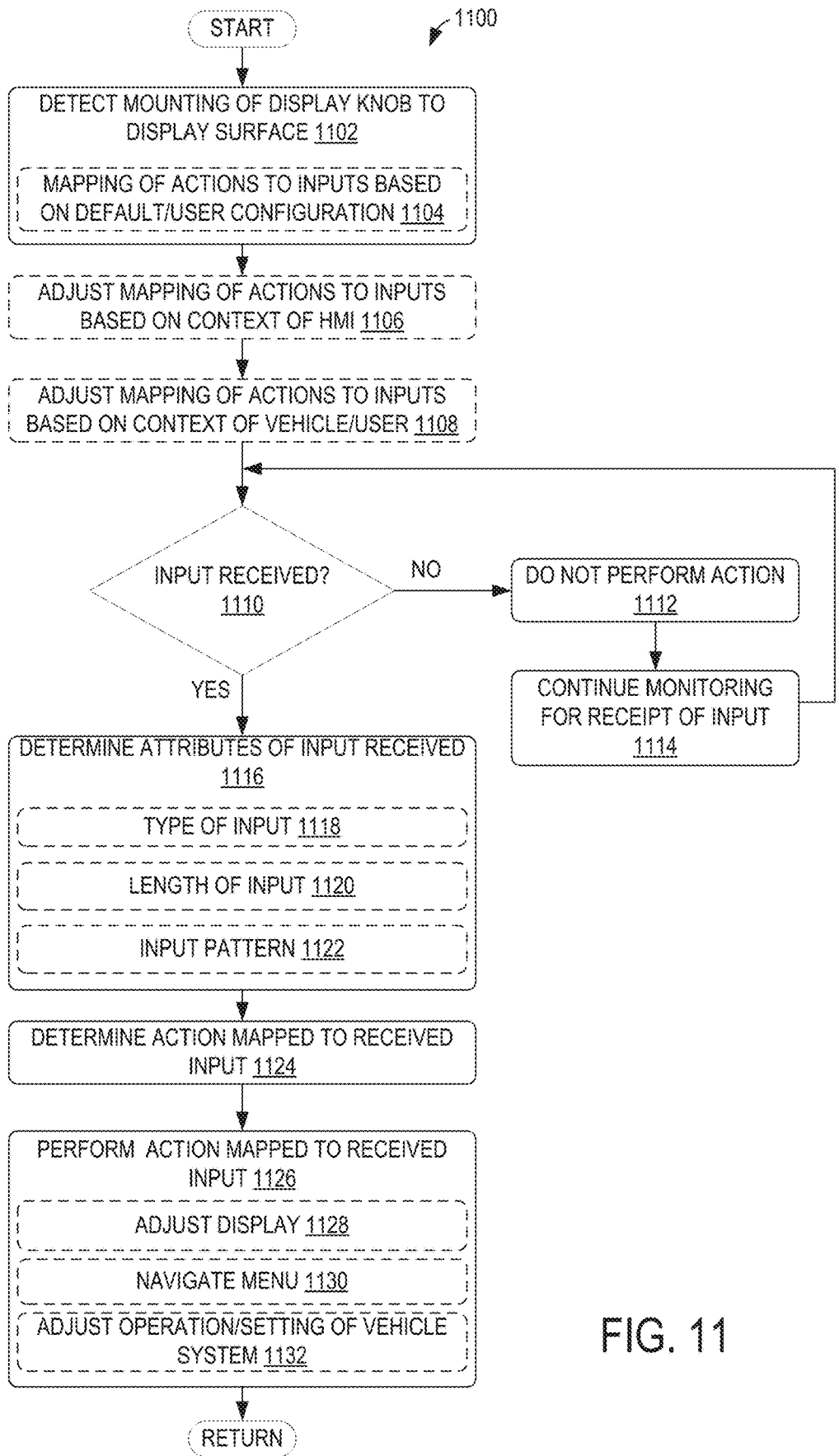
FIG. 11 is a flow chart of an example method of interacting with a dynamic reconfigurable display knob in accordance with one or more embodiments of the present disclosure.

FIG. 11 is a flow chart of an example method 1100 of interacting with a dynamic reconfigurable display knob (e.g., display knob 300 of FIG. 3 and/or display knob 704 of FIGS. 7-10). The method 1100 may be performed by any suitable controller or combination of controllers, including but not limited to a controller/processor integrated in the display knob, a controller/processor integrated and/or communicatively coupled to a PCB to which the display knob is connected, a controller/processor of a vehicle and/or in-vehicle computing system, and/or an external/remote controller/processor (e.g., a server computing device). At 1102, the method includes detecting the mounting of the display knob to a display surface. As indicated at 1104, the mapping of actions to inputs to the display knob may be based on a default or user configuration. At 1106, the method optionally includes adjusting mapping of actions to inputs based on a context of a human-machine interface (e.g., a graphical user interface of an in-vehicle computing system). At 1108, the method optionally includes adjusting mapping of actions to inputs based on a context of the vehicle/user or other display environment of the display knob.

At 1110, the method includes determining if input has been received. If no input has been received (e.g., "NO" at 1110), the method proceeds to 1112 to not perform any action (e.g., to make no changes to the knob, associated computing device, and/or vehicle system responsive to a knob actuation) and to continue monitoring for receipt of input, as indicated at 1114. The method then returns to 1110 to check if input has been received.

If input has been received (e.g., "YES" at 1110), the method proceeds to 1116. At 1116, the method includes determining attributes of the input that is received. For example, the attributes may include a type of input, as indicated at 1118, a length of input, as indicated at 1120, an input pattern (e.g., a combination of inputs separated by pauses that are less than a threshold), as indicated at 1122, and/or any other suitable attribute. At 1124, the method includes determining an action mapped to the received input (e.g., by querying a table/map stored in memory). At 1126, the method includes performing the action mapped to the received input. The action may include one or more of adjusting the display (e.g., integrated in or projected via the display knob, or an external display), as indicated at 1128, navigating a menu, as indicate at 1130, and adjusting operations/settings of a vehicle system, as indicated at 1132.

Figure 12A:
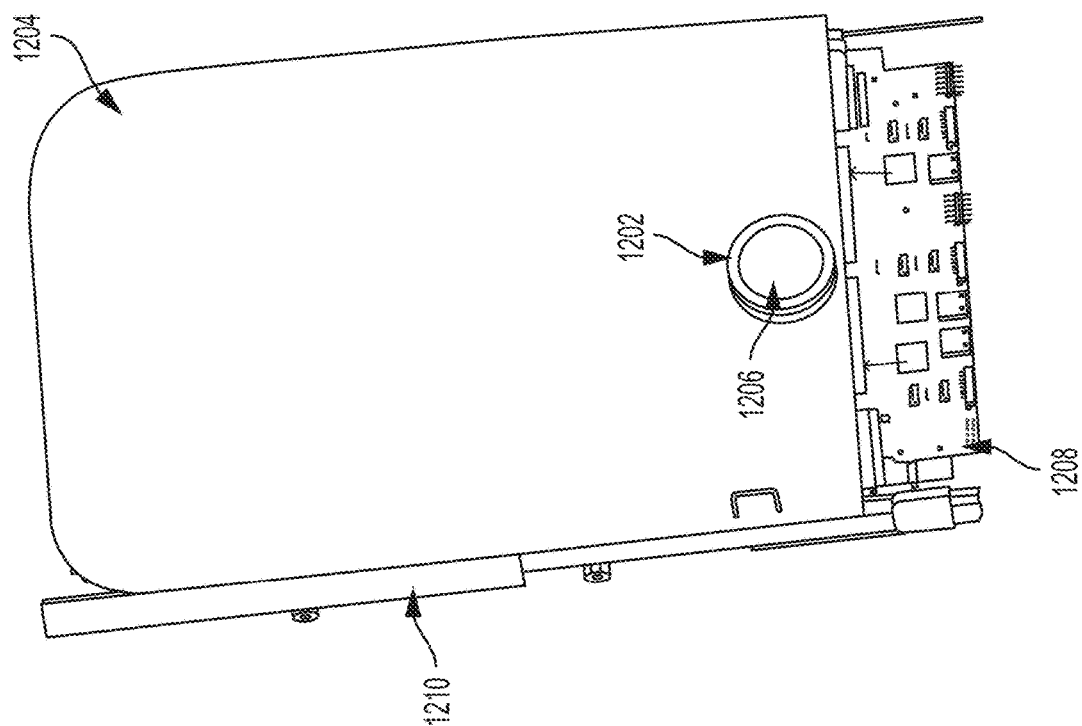
FIGS. 12A and 12B show another example of a reconfigurable display knob mounted on a surface in accordance with one or more embodiments of the present disclosure.
Figure 12B:
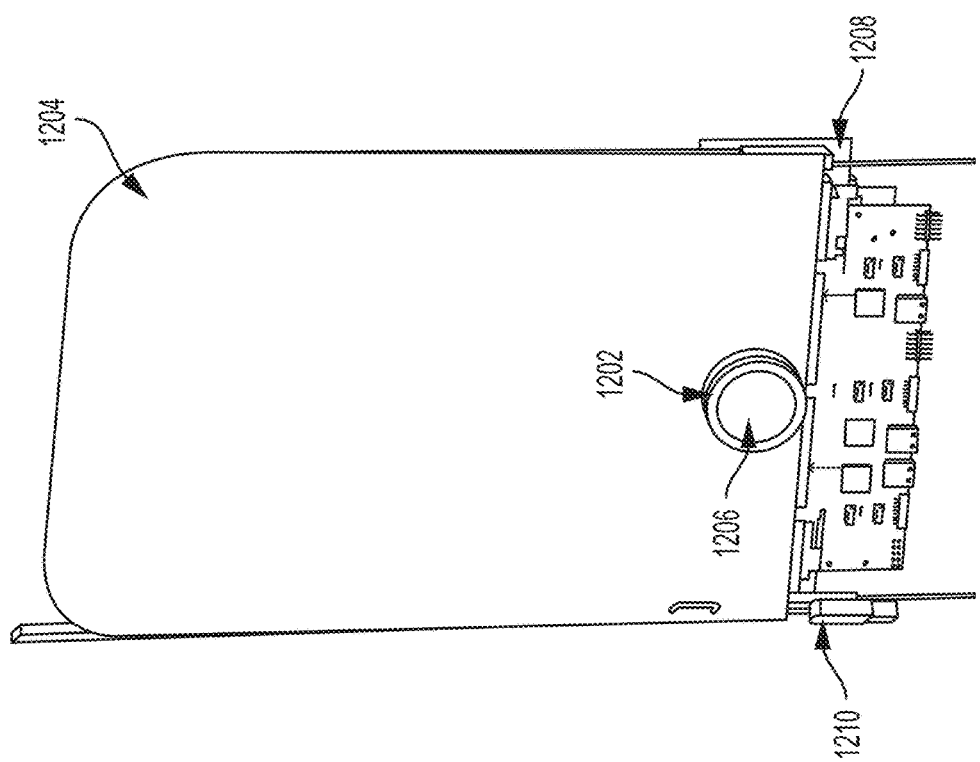

FIGS. 12A and 12B show another example of a reconfigurable display knob 1202 mounted on a surface 1204. The surface 1204 may correspond to a display within a vehicle (e.g., an in-vehicle computing system display, such as touch screen 108 of FIG. 1), another surface of an interior of a vehicle, and/or any other suitable mounting surface. The display knob 1202 may include a reconfigurable display 1206 on a top surface of the knob, and a connection interface (e.g., connectivity components 306 and securing components 308 of FIG. 3) opposite the display 1206. The connection interface may include structural components (e.g., magnets, plugs, conductive surfaces, etc.) for removably coupling the display knob 1202 to a control circuit, such as printed circuit board 1208. Portions of the printed circuit board 1208 and/or the connection interface of the knob 1202 may pass through the mounting surface 1204 to allow the two components to couple to one another and to secure the display knob on the surface 1204. As shown in FIG. 12B, the surface 1204 may include and/or be coupled to a mounting mechanism 1210 for coupling the surface to a vehicle or other structure.

The printed circuit board 1208 may include components configured to generate and/or pass control instructions to control the display 1206 of the display knob, a display associated with the surface 1204, and/or components associated with an in-vehicle computing system (e.g., vehicle systems). The printed circuit board 1208 may also receive and/or generate control instructions responsive to input provided to the display knob 1202 (e.g., rotation input, touch input, press input, etc.). Examples of such control instructions are described in more detail above (e.g., with respect to FIG. 11).

The disclosure further provides for a device for a human-machine interface, the device including a display on a first surface of the device, an input interface adapted to detect one or more of touch input, rotation input, and push input directed to the device, a controller configured to generate control instructions based on input received from the input interface, the control instructions including display instructions for controlling output on the display, and an output interface configured to send at least a subset of the control instructions from the controller to a receiving device, the device being removably coupled to the receiving device. In a first example, the device further includes a projector for projecting light around a perimeter of the first surface of the device, wherein the controller is further configured to control the projection of light via the projector based on one or more of a status of the receiving device and user input received via the input interface. A second example of the device optionally includes the first example, and further includes the device, wherein the controller is configured to control the projector to display a plurality of selectable menu items around the perimeter of the first surface of the device responsive to user input received via the input interface. A third example of the device optionally includes one or both of the first and the second examples, and further includes the device, further comprising a haptic feedback module configured to output haptic feedback responsive to input received via the input interface. A fourth example of the device optionally includes one or more of the first through the third examples, and further includes the device, wherein the receiving device comprising an in-vehicle computing system of a vehicle, and wherein the subset of control instructions include instructions for controlling one or more vehicle systems of the vehicle based on user input received by the input interface. A fifth example of the device optionally includes one or more of the first through the fourth examples, and further includes the device, wherein the output interface includes a wireless interface adapted to communicate with the in-vehicle computing system via a wireless communication mechanism. A sixth example of the device optionally includes one or more of the first through the fifth examples, and further includes the device, wherein the output interface includes a wired interface adapted to communicate with the in-vehicle computing system via a hardwired connection. A seventh example of the device optionally includes one or more of the first through the sixth examples, and further includes the device, wherein the output interface is coupled to the in-vehicle computing system via a lollipop-shaped printed circuit board. An eighth example of the device optionally includes one or more of the first through the seventh examples, and further includes the device, wherein the display on the first surface of the device is a first display and the lollipop-shaped printed circuit board is planar with a rear surface of a second display of the in-vehicle computing system, the device being configured to connect to the printed circuit board through an opening in a front surface of the second display, and the controller of the device configured to project light onto the second display and/or send display instructions to the in-vehicle computing system to control the second display based on input received via the input interface. A ninth example of the device optionally includes one or more of the first through the eighth examples, and further includes the device, wherein one or more of the device, the second display, and the lollipop-shaped printed circuit board includes or is coupled to one or more magnetic structures, the device being removably mounted to the second display via magnetic coupling provided by the one or more magnetic structures.

The disclosure further provides for a method for controlling a human-machine interface via an input device removably coupled to a receiving device, the method including receiving, via an input interface of the input device, user input including one or more of touch input, rotation input, and push input provided to the input device, generating, via a controller of the input device, control instructions based on the user input, the control instructions including display instructions for controlling output on a display positioned on a top surface of the input device, and sending, via an output interface of the input device, at least a subset of the generated control instructions to the receiving device. In a first example of the method, the method further includes projecting, via a projector of the input device, light around a perimeter of the input device based on one or more of a status of the receiving device and the user input. A second example of the method optionally includes the first example, and further includes the method, wherein projecting light around the perimeter of the input device includes displaying a plurality of selectable menu items around a perimeter of the top surface of the input device responsive to user input received via the input interface. A third example of the method optionally includes one or both of the first and the second examples, and further includes the method, wherein the receiving device includes an in-vehicle computing system and the display of the input device is a first display, the input device being removably mounted to a second display of the in-vehicle computing system presenting user interface elements for the human-machine interface. A fourth example of the method optionally includes one or more of the first through the third examples, and further includes the method, further comprising changing a mode of the human-machine interface responsive to a first actuation of the input device. A fifth example of the method optionally includes one or more of the first through the fourth examples, and further includes the method, further comprising controlling operation of a media player or radio of the in-vehicle computing device responsive to a second actuation of the input device. A sixth example of the method optionally includes one or more of the first through the fifth examples, and further includes the method, further comprising controlling operation of a climate system of a vehicle associated with the in-vehicle computing device responsive to a third actuation of the input device. A seventh example of the method optionally includes one or more of the first through the sixth examples, and further includes the method, further comprising controlling operation of a plurality of vehicle systems responsive to an actuation of the input device, the actuation including a sequence of inputs to the input device mapped to one or more specific settings for each of the plurality of vehicle systems. An eighth example of the method optionally includes one or more of the first through the seventh examples, and further includes the method, further comprising determining a location of a user providing input to the input device, and changing the control instructions based on the location of the user. A ninth example of the method optionally includes one or more of the first through the eighth examples, and further includes the method, wherein changing the control instructions includes changing a location of content displayed on the display of the input device and/or displayed on a display of the receiving device.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109 and/or display knob 300 described with reference to FIGS. 1 and 3. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A device for a human-machine interface, the device comprising:
    a display on a first surface of the device;
    an input interface adapted to detect one or more of touch input, rotation input, and push input directed to the device;
    a controller configured to generate control instructions based on input received from the input interface, the control instructions including display instructions for controlling output on the display;
    an output interface configured to send at least a subset of the control instructions from the controller to a receiving device, the device being removably coupled to the receiving device; and
    a projector for projecting light around a perimeter of the first surface of the device, wherein the controller is further configured to control the projection of light via the projector based on one or more of a status of the receiving device and user input received via the input interface.

2. The device of claim 1, wherein the controller is configured to control the projector to display a plurality of selectable menu items around the perimeter of the first surface of the device responsive to user input received via the input interface.

3. The device of claim 1, further comprising a haptic feedback module configured to output haptic feedback responsive to input received via the input interface.

4. The device of claim 1, wherein the receiving device comprises an in-vehicle computing system of a vehicle, and wherein the subset of control instructions include instructions for controlling one or more vehicle systems of the vehicle based on user input received by the input interface.

5. The device of claim 4, wherein the output interface includes a wireless interface adapted to communicate with the in-vehicle computing system via a wireless communication mechanism.

6. The device of claim 4, wherein the output interface includes a wired interface adapted to communicate with the in-vehicle computing system via a hardwired connection.

7. The device of claim 4, wherein the output interface is coupled to the in-vehicle computing system via a lollipop-shaped printed circuit board, and the display on the first surface of the device is a first display and the lollipop-shaped printed circuit board is planar with a rear surface of a second display of the in-vehicle computing system, the device being configured to connect to the printed circuit board through an opening in a front surface of the second display, and the controller of the device configured to project light onto the second display and/or send display instructions to the in-vehicle computing system to control the second display based on input received via the input interface.

8. The device of claim 7, wherein one or more of the device, the second display, and the lollipop-shaped printed circuit board includes or is coupled to one or more magnetic structures, the device being removably mounted to the second display via magnetic coupling provided by the one or more magnetic structures.

9. The device of claim 1, wherein the receiving device includes a media console.

10. A method for controlling a human-machine interface via an input device removably coupled to a receiving device, the method comprising:
    receiving, via an input interface of the input device, user input including one or more of touch input, rotation input, and push input provided to the input device;
    generating, via a controller of the input device, control instructions based on the user input, the control instructions including display instructions for controlling output on a display positioned on a top surface of the input device;
    sending, via an output interface of the input device, at least a subset of the generated control instructions to the receiving device; and
    projecting, via a projector of the input device, light around a perimeter of the input device based on one or more of a status of the receiving device and the user input.

11. The method of claim 10, wherein projecting light around the perimeter of the input device includes displaying a plurality of selectable menu items around a perimeter of the top surface of the input device responsive to user input received via the input interface.

12. The method of claim 10, wherein the receiving device includes an in-vehicle computing system and the display of the input device is a first display, the input device being removably mounted to a second display of the in-vehicle computing system presenting user interface elements for the human-machine interface.

13. The method of claim 12, further comprising changing a mode of the human-machine interface responsive to a first actuation of the input device.

14. The method of claim 13, further comprising controlling operation of a media player or radio of the in-vehicle computing device responsive to a second actuation of the input device.

15. The method of claim 14, further comprising controlling operation of a climate system of a vehicle associated with the in-vehicle computing device responsive to a third actuation of the input device.

16. The method of claim 10, further comprising controlling operation of a plurality of vehicle systems responsive to an actuation of the input device, the actuation including a sequence of inputs to the input device mapped to one or more specific settings for each of the plurality of vehicle systems.

17. The method of claim 10, further comprising determining a location of a user providing input to the input device, and changing the control instructions based on the location of the user.

18. The method of claim 17, wherein changing the control instructions includes changing a location of content displayed on the display of the input device and/or displayed on a display of the receiving device.

* * * * *